US009928248B2

(12) United States Patent
Akirav et al.

(10) Patent No.: US 9,928,248 B2
(45) Date of Patent: Mar. 27, 2018

(54) SELF-HEALING BY HASH-BASED DEDUPLICATION

(71) Applicant: INTERNATIONAL BUSINESS MACHINES CORPORATION, Armonk, NY (US)

(72) Inventors: Shay H. Akirav, Petach-Tikva (IL); Michael Hirsch, Mazkeret Batya (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 192 days.

(21) Appl. No.: 13/936,578

(22) Filed: Jul. 8, 2013

(65) Prior Publication Data

US 2015/0012503 A1 Jan. 8, 2015

(51) Int. Cl.
*G06F 17/30* (2006.01)

(52) U.S. Cl.
CPC .............................. *G06F 17/30156* (2013.01)

(58) Field of Classification Search
CPC .................... G06F 17/30067; G06F 17/30489
USPC .......................................................... 707/692
See application file for complete search history.

(56) References Cited

U.S. PATENT DOCUMENTS 7,694,191 B1 4/2010 Bono et al.
7,992,037 B2 8/2011 Dubnicki et al.
2003/0167439 A1* 9/2003 Talagala et al. .............. 714/770
2007/0097802 A1* 5/2007 Polson .............. G11B 7/00736 369/30.07
2009/0307251 A1 12/2009 Heller et al.
2010/0037118 A1 2/2010 Saliba et al.
2014/0006465 A1* 1/2014 Davis et al. .................. 707/827
2014/0181575 A1* 6/2014 Kalach et al. ............... 714/6.11

OTHER PUBLICATIONS

IPCOM000207991D; "Instant Migration and Recovery for Deduplication Servers Using Portable Index Storage"; http://priorartdatabase.com/IPCOM/000207991; Jun. 17, 2011.
Anonymous; "Method for identifying Image Objects with Similar Intent from Multiple Documents to aid Block Level De-duplication in Storage Clouds"; http://priorartdatabase.com/IPCOM/000210334; Aug. 30, 2011.
Dubois, L. et al.; "Backup and Recovery: Accelerating Efficiency and Driving Down IT Costs Using Data De-duplication"; www.idc.com/whitepaper . . . ; Feb. 2010.
Nexenta Inc.; "Versioned De-duplicated Object Storage", Nexenta Inc.; Caitlin.bestler@nexenta.com; www.nexenta.com/ . . . ; 2012.

* cited by examiner

*Primary Examiner* — Syling Yen
*Assistant Examiner* — Allen Lin
(74) *Attorney, Agent, or Firm* — Griffiths & Seaton PLLC

(57) ABSTRACT

For self-healing in a hash-based deduplication system using a processor device in a computing environment, deduplication digests of data and a corresponding list of the deduplication digests in a table of contents (TOC) are maintained for the self-healing of data that is lost or unreadable. The input data digests are compared to the TOC if directed to data that is lost or unreadable, and the input data digests are used to repair the one of lost and unreadable data.

15 Claims, 12 Drawing Sheets

Using a Damaged Digest List:
2 User-level Stored Entities sharing 2 of 3 blocks

Using a Damaged Digest List:
2 User-level Stored Entities sharing 2 of 3 blocks

Using a Damaged Digest List:
Loss of Block 3 causes loss of readability of both User-Level Stored Entities Using a Damaged Digest List:
A new instance of a block with digest C restores readability Using a Damaged Digest List:
Reading data possibly with damaged blocks Using a Damaged Digest List:
Updating data structures when processing new data Using a Digest to Block Map:
2 User-level Stored Entities sharing 2 of 3 blocks Using a Digest to Block Map:
Loss of Block 3 causes loss of readability of both User-level Stored Entities Using a Digest to Block Map:
Loss of Block 3 causes loss of readability of both
User-level Stored Entities Using a Digest to Block Map:
Reading data possibly with damaged blocks Using a Digest to Block Map:
Updating data structures when processing new data

SELF-HEALING BY HASH-BASED DEDUPLICATION

BACKGROUND OF THE INVENTION

Field of the Invention

The present invention relates in general to computers, and more particularly to self-healing by a hash-based deduplication system in a computing environment.

Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. An efficient way to alleviate the problem is by using deduplication. The idea underlying a deduplication system is to exploit the fact that large parts of the available data is copied again and again and forwarded without any change, by locating repeated data and storing only its first occurrence. Subsequent copies are replaced with pointers to the stored occurrence, which significantly reduces the storage requirements if the data is indeed repetitive.

SUMMARY OF THE DESCRIBED EMBODIMENTS

In one embodiment, a method is provided for self-healing in a hash-based deduplication system, in a computing environment. In one embodiment, by way of example only, deduplication digests of data and a corresponding list of the deduplication digests in a table of contents (TOC) are maintained for the self-healing of data that is lost or unreadable. The input data digests are compared to the TOC if directed to data that is lost or unreadable, and the input data digests are used to repair the one of lost and unreadable data.

In another embodiment, a computer system is provided for self-healing in a hash-based deduplication system, in a computing environment. The computer system includes a computer-readable medium and at least one processor in operable communication with the computer-readable medium. The processor maintains deduplication digests of data and a corresponding list of the deduplication digests in a table of contents (TOC) for the self-healing of data that is lost or unreadable. The input data digests are compared to the TOC if directed to data that is lost or unreadable, and the input data digests are used to repair the one of lost and unreadable data.

In a further embodiment, a computer program product is provided for self-healing in a hash-based deduplication system, in a computing environment. The computer-readable storage medium has computer-readable program code portions stored thereon. The computer-readable program code portions include a first executable portion that maintains deduplication digests of data and a corresponding list of the deduplication digests in a table of contents (TOC) for the self-healing of data that is lost or unreadable. The input data digests are compared to the TOC if directed to data that is lost or unreadable, and the input data digests are used to repair the one of lost and unreadable data.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
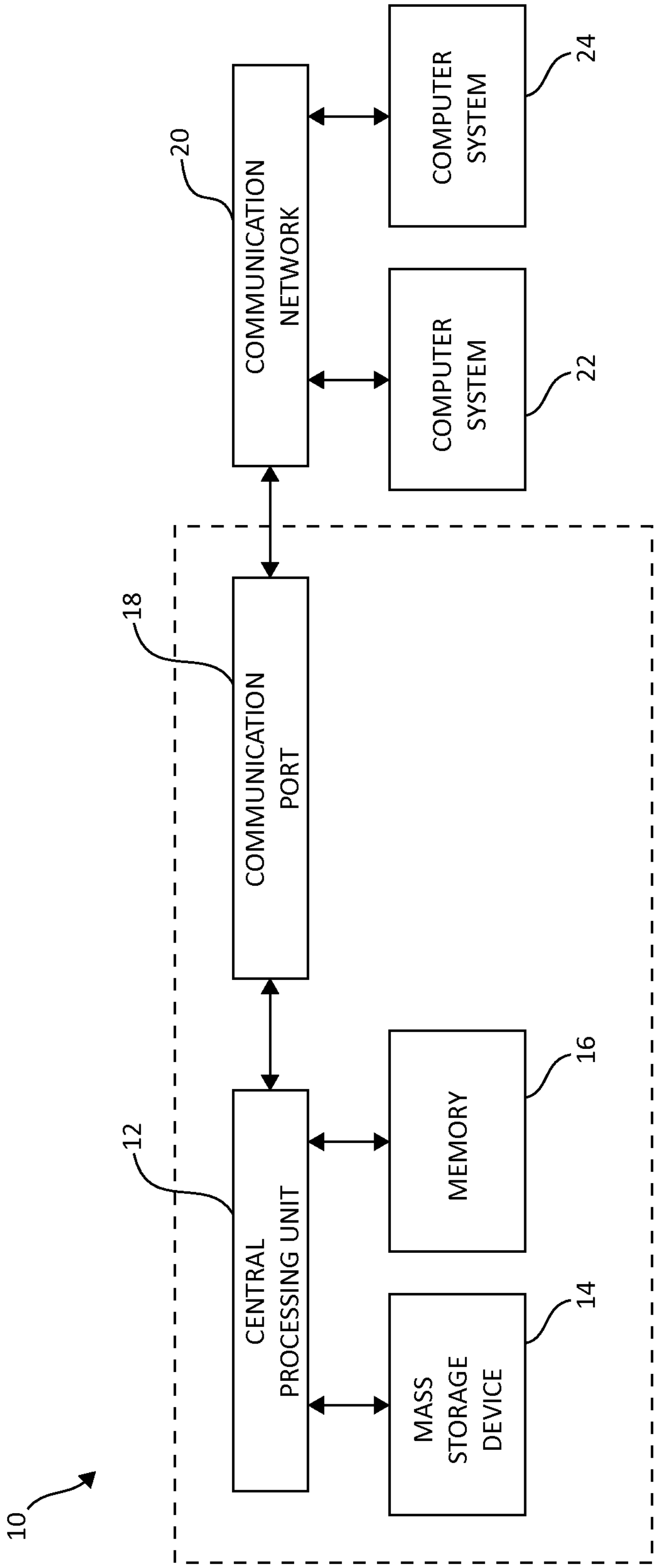
FIG. 1 is a block diagram illustrating a computing system environment having an example storage device in which aspects of the present invention may be realized.

Data deduplication refers to the reduction and/or elimination of repetitive data. In data deduplication, a data object, which may be a file, a data stream, or some other form of data, is broken down into one or more parts called sub-blocks. In a data deduplication process, duplicate copies of data are reduced or eliminated, leaving a minimal amount of redundant copies, or a single copy of the data, respectively. The reduction of redundant data is known as compression. Deduplication is a special kind of compression, targeting repetitive data. Using deduplication processes provides a variety of benefits, such as reduction of required storage capacity and increased network bandwidth. Due to these and other benefits, deduplication has emerged in recent years as a highly important technological field in computing storage systems.

In a hash-based duplication operation, data deduplication involves segmenting data into variable or fixed-sized sub-blocks, calculating the hash of each of the sub-blocks, and matching identical sub-blocks by their hashes. In a data deduplication process, duplicate copies of data are reduced or eliminated, leaving a minimal amount of redundant copies, or a single copy of the data, respectively. In other words, a deduplication system is based on the idea of partitioning a large repository into segments called chunks, and saving for each chunk a cryptographically strong hash value that can be used to identify the chunk with probability close to 1. Storing only the hash values in a table requires just a small fraction of the space occupied by the repository itself. If a new chunk is added to the repository, its hash value is searched for in the table, and if it is found, it may be concluded that the new chunk is an exact copy of a previous one, so all one needs to store is a pointer to the earlier occurrence.

In addition, because a deduplication system is a data storage system it has all the responsibilities and vulnerabilities of a storage system to protect its users' data. Usually, this means keeping data in some form or another, which enables survivability in face of one failure or sometimes even a second failure before the first could be completely recovered. Usually, this is some kind of parity RAID, e.g. RAID 6, or in the case of data requiring higher performance, even three copies of the data on different physical disk drives. However, even three copies are often not enough.

Power outages that last long enough may take a system out of action temporarily, and/or fires and floods may destroy systems. Also, data loss may occur as a result of human error (e.g., a disk drive going bad and the technician arriving to replace it but pulling the wrong drive, destroying the data on an entire RAID system). Firmware bugs in devices or RAID arrays, or software bugs in the deduplication system itself can render various parts of backup data unrecoverable. For these reasons, important data, even backup data, is often replicated to remote sites. The replication usually is delayed (asynchronous) for performance reasons, and to utilize communication lines when not needed for higher priority tasks. This unfortunately introduces a window of exposure where the data exists only in the local site and may be in transit but has not yet reached a stable state in the remote site. However, these measures do not completely eliminate the possibility of data loss; they only reduce they possibility of data loss. Data loss in a deduplicating system can be especially painful if lost data is shared between multiple user-level stored entities. A single lost storage block that is common between many user-level stored entities essentially renders all these stored entities unreadable. As described and used herein, the terms "hash", "fingerprint" and "digest" may be used interchangeably. In one embodiment, a hash based deduplication system stores hashes (also known as fingerprints) of data in User-level Stored Entities in a format that enables quick retrieval and efficient searching of the hashes (e.g., hash values). In one embodiment, this is done to enable their purpose: identifying what new data is already stored and does not need to be stored again. In one embodiment, the hash storage includes pointers to where the actual data is stored, usually in a data storage area that is shared between all deduplicated stored entities. This dual structure puts the hash deduplication system in a unique position. In one embodiment, the hash deduplication system stores the user data and also stores the hash of the data, which is a probabilistically unique fingerprint.

In the event that user data is lost, the probabilistically unique hash still exists. The hash deduplication system no longer has the data that was lost, but if the same data is ever backed up again, the system can tell that it is highly likely that this is the data that was lost, and so can take steps to restore the readability of User-level Stored Entities that referred to the lost data. Thus, in one embodiment, by way of example only, a deduplication system (e.g., a hash-based deduplication system) is provided, where upon finding that data is lost or unreadable, the deduplication system maintains the deduplication digest(s) of the data and a list of the digest(s). In one embodiment, by way of example only, the deduplication system compares input data digests (if directed to data that is lost or unreadable) to the list of the digest(s), and use the incoming data to repair the lost or unreadable data. In one embodiment, if users stores digests, a storage server digest-to-block map may delete map entries to bad data.

Thus, in one embodiment, by way of example only, the present invention provides a solution for self-healing in a hash-based deduplication system, in a computing environment. In one embodiment, by way of example only, deduplication digests of data and a corresponding list of the deduplication digests in a table of contents (TOC) are maintained for the self-healing of data that is lost or unreadable. The input data digests are compared to the TOC if directed to data that is lost or unreadable, and the input data digests are used to repair the one of lost and unreadable data.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
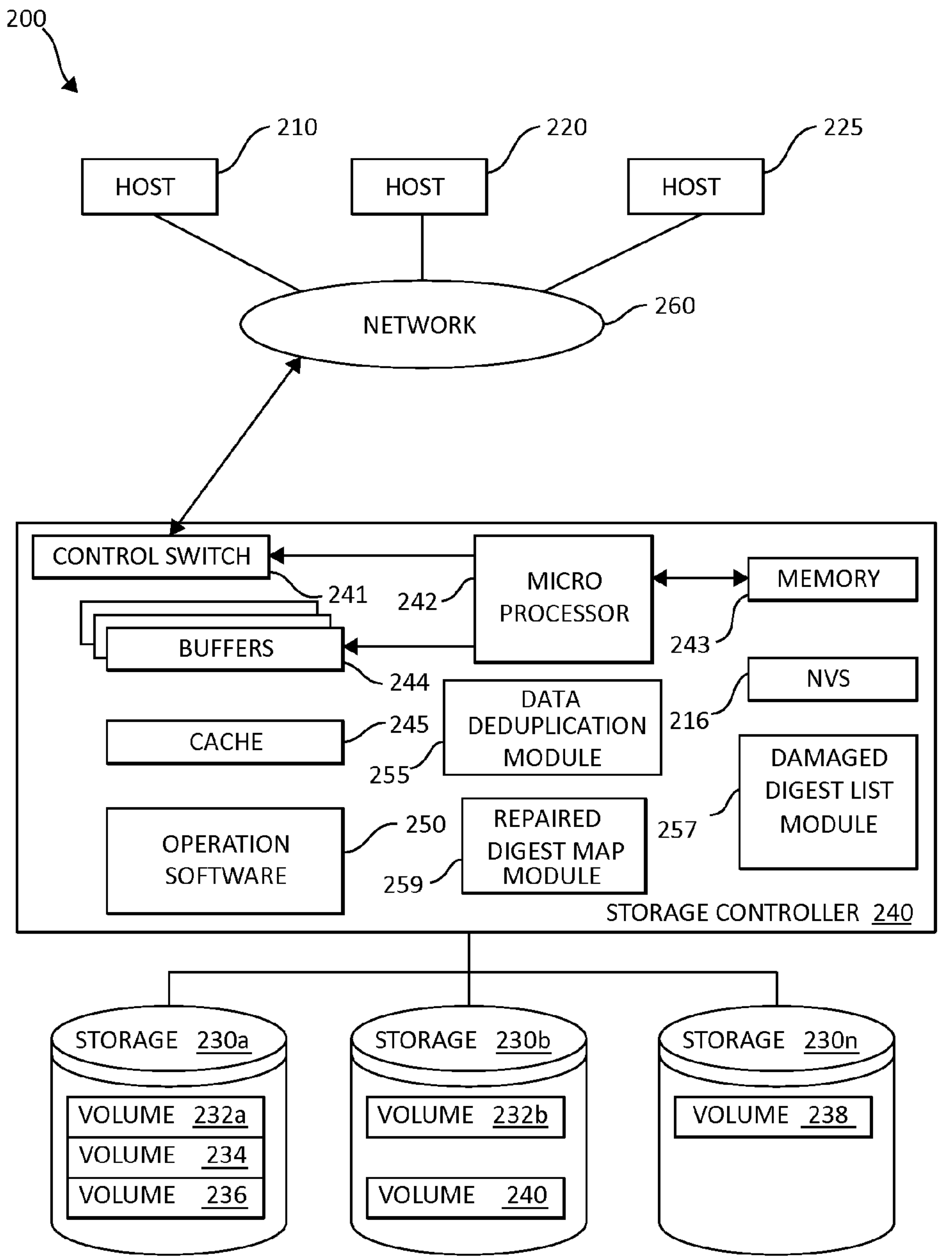
FIG. 2 is a block diagram illustrating a hardware structure of data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230*a*, 230*b*, and 230*n* in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230*a*, 230*b* and 230*n* are shown as ranks in data storage system 200, and are referred to herein as rank 230*a*, 230*b* and 230*n*. Ranks may be local to data storage system 200, or may be located at a physically remote location. In other words, a local storage controller may connect with a remote storage controller and manage storage at the remote location. Rank 230*a* is shown configured with two entire volumes, 234 and 236, as well as one partial volume 232*a*. Rank 230*b* is shown with another partial volume 232*b*. Thus volume 232 is allocated across ranks 230*a* and 230*b*. Rank 230*n* is shown as being fully allocated to volume 238—that is, rank 230*n* refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a data deduplication module 255 (e.g., a hash-based data deduplication module), a damaged digest list module 257, and a repaired digest map module 259. The data deduplication module 255, the damaged digest list module 257, and the repaired digest map module 259 may work in conjunction with each and every component of the storage controller 240, the hosts 210, 220, 225, and storage devices 230. The data deduplication module 255, the damaged digest list module 257, and the repaired digest map module 259 may be structurally one complete module or may be associated and/or included with other individual modules. The data deduplication module 255, the damaged digest list module 257, and the repaired digest map module 259, may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the data deduplication module 255, the damaged digest list module 257, and the repaired digest map module 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, data deduplication module 255, the damaged digest list module 257, and the repaired digest map module 259 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

As mentioned above, the data deduplication module 255, the damaged digest list module 257, and the repaired digest map module 259, may also be located in the cache 245 or other components. As such, one or more of the data deduplication module 255, the damaged digest list module 257, and the repaired digest map module 259, may be used as needed, based upon the storage architecture and users preferences.

As described herein, the present invention provides solutions to implement self-healing of lost deduplicated data based on the type of deduplication system (e.g., at least 2 ways). In one embodiment, a first way is illustrated for a deduplication system (e.g., IBM® ProtecTIER® deduplication system) based on one of a variety of implementation structures used in the deduplication system and how the IBM® ProtecTIER® deduplication system may implement the present invention. The second is how other deduplication systems, besides the IBM® ProtecTIER® deduplication system, would implement these ideas as this is closer to their existing implementation.

Figure 3:
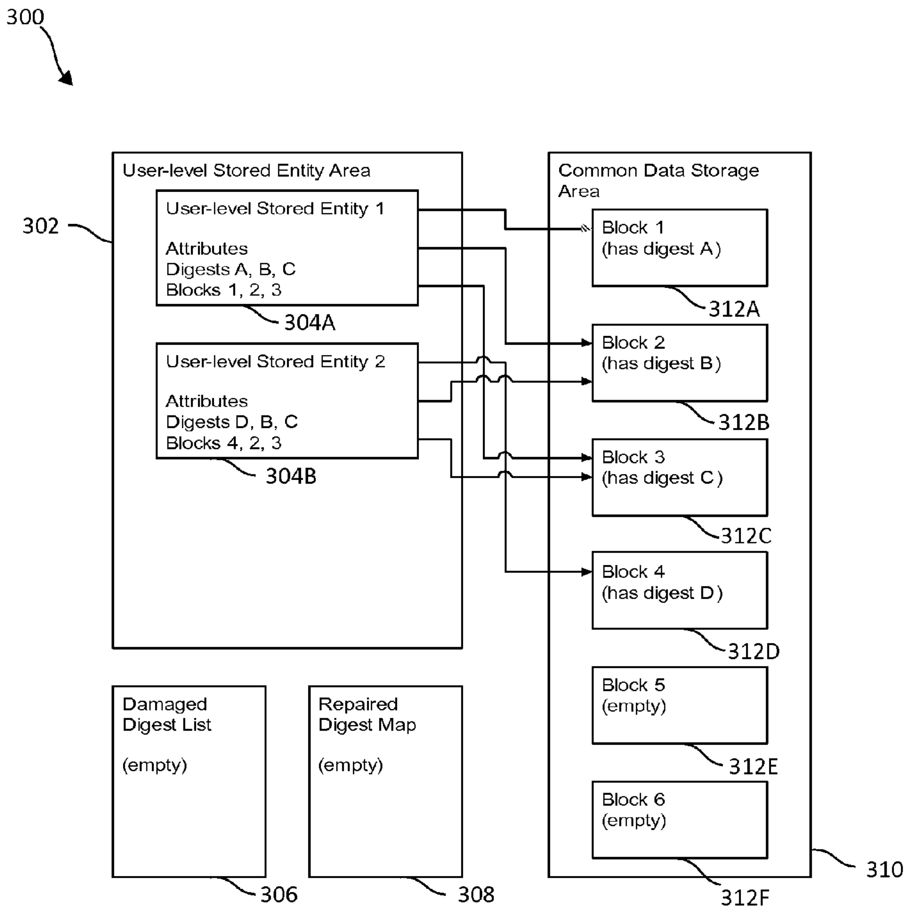
FIG. 3 is a block diagram illustrating a hardware structure using a damaged digest list with 2 user-level stored entities sharing 2 of 3 blocks in which aspects of the present invention may be realized.

For example, in one embodiment, by way of example only, the present invention provides solutions to implement self-healing of lost deduplicated data via implementation using a "damaged digest list" and/or a "repaired digest map," as described below. Turning now to FIG. 3, a block diagram illustrating a hardware structure 300 using a damaged digest list with 2 user-level stored entities sharing 2 of 3 blocks in which aspects of the present invention may be realized. As illustrated in FIG. 3, the present invention implements self-healing of a lost deduplicated data via implementation using the damaged digest list 306 and/or the repaired digest map 308. In one embodiment, every user-level stored entity 304 (illustrated in FIG. 3 304A-B) (which may be a part and/or an entire portion of a virtual tape cartridge, a part and/or an entire portion of an original sound track image "OST" image, a part and/or an entire portion of a file stored in a network-attached storage (NAS) device, and/or some other kind of stored object and/or binary large object "blob", and the like) stores its list of digests and a table of contents (TOC). The TOC, as shown within the user-level stored entities 304 showing the attributes, digests, and blocks, is a list of references to storage blocks 312 (e.g., illustrated in FIG. 3 as 312A-F) in a common storage area 310 where each entry 304 lists a block 312 and/or range of blocks 312A-F and/or an offset and range within the block or list of blocks. Given an initial repository content with 2 User-level Stored Entities 304, a repository may have the structure indicated in FIG. 3. For example, the digests of the data of User-level Stored Entity 2 304B are D, B, and C and the TOC of this entity 304B contains pointers to blocks 4, 2, and 3. For example, as illustrated in FIG. 3, user-level stored entity 304A shows the digest A, B, and C referencing to storage block 1 312A, storage block 2 312 B, and storage block 3 312C. The user-level stored entity 304B shows the digest D, B, and C referencing to storage block 4 312D, storage block 2 312 B, and storage block 3 312C. The data in the user-level stored entity 304 is the concatenation of the data in the offset-ranges of the block 312 or list of blocks 312 that are listed in the list of block references.

Figure 4:
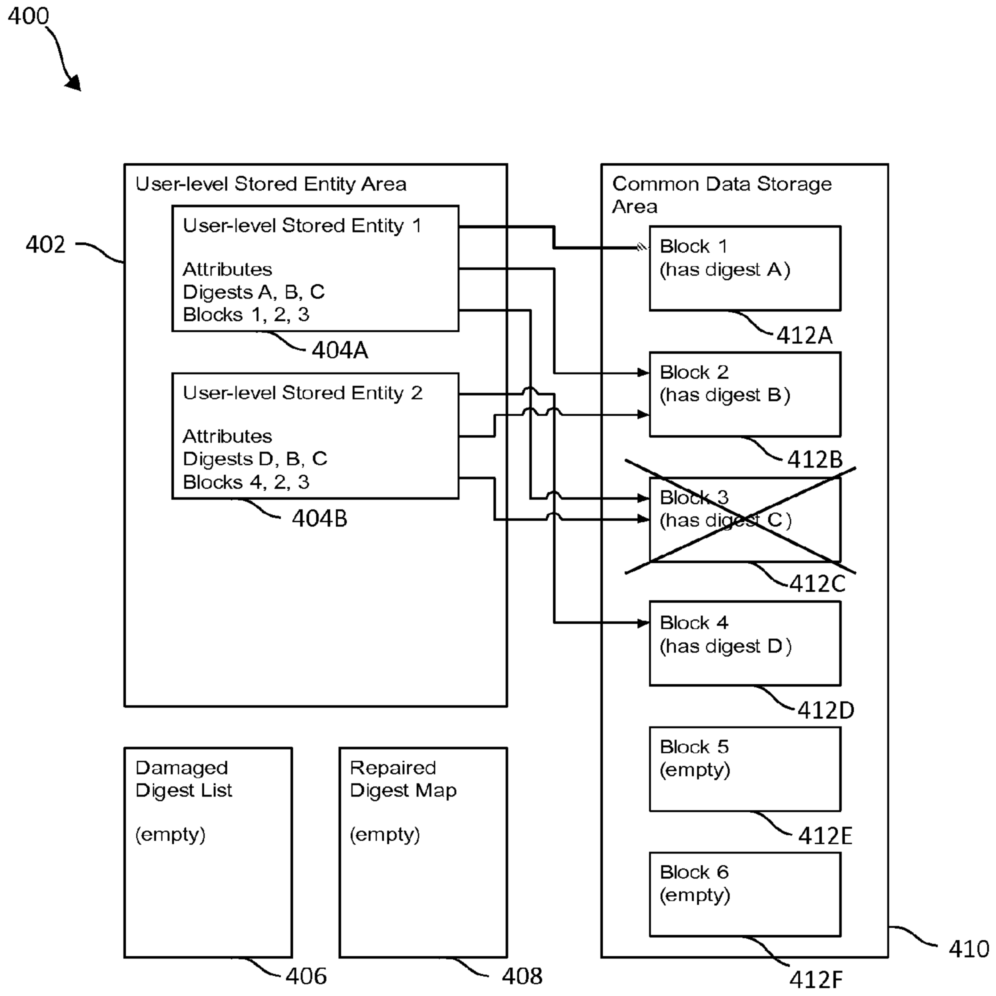
FIG. 4 is a block diagram illustrating a hardware structure using a damaged digest list with loss of a block causing loss of readability of both user-level stored entities in which aspects of the present invention may be realized.

FIG. 4 is a block diagram illustrating a hardware structure 400 using a damaged digest list with loss of a block causing loss of readability of both user-level stored entities in which aspects of the present invention may be realized. As illustrated in FIG. 4, the present invention implements self-healing of a lost deduplicated data via implementation using the damaged digest list 406 and/or the repaired digest map 408. In one embodiment, every user-level stored entity 404 (illustrated in FIG. 4 404A-B) stores its list of digests and a table of contents (TOC). The TOC, as shown within the user-level stored entities 404 showing the attributes, digests, and blocks, is a list of references to storage blocks 412 (e.g., illustrated in FIG. 4 as 412A-F) in a common storage area 410 where each entry 404 lists a block 412 and/or range of blocks 412A-F and/or an offset and range within the block or list of blocks. Given an initial repository content with 2 User-level Stored Entities 404, a repository may have the structure indicated in FIG. 4. For example, the digests of the data of User-level Stored Entity 2 404B are D, B, and C and the TOC of this entity 404B contains pointers to blocks 4, 2, and 3. For example, as illustrated in FIG. 4, user-level stored entity 404A shows the digest A, B, and C referencing to storage block 1 412A, storage block 2 412 B, and storage block 3 412C. The user-level stored entity 404B shows the digest D, B, and C referencing to storage block 4 412D, storage block 2 412 B, and storage block 3 412C. The data in the user-level stored entity 404 is the concatenation of the data in the offset-ranges of the block 412 or list of blocks 412 that are listed in the list of block references. However, FIG. 4 describes the situation when one of the blocks can no longer be read. In this example, it is block 3, 412C. This actually renders both User-Level Stored Entities 404A and

404B unreadable since block 3 412C contains data needed by both. When this is discovered, digest C is added to the damaged digest list 406 (as detailed in FIG. 6).

Figure 5:
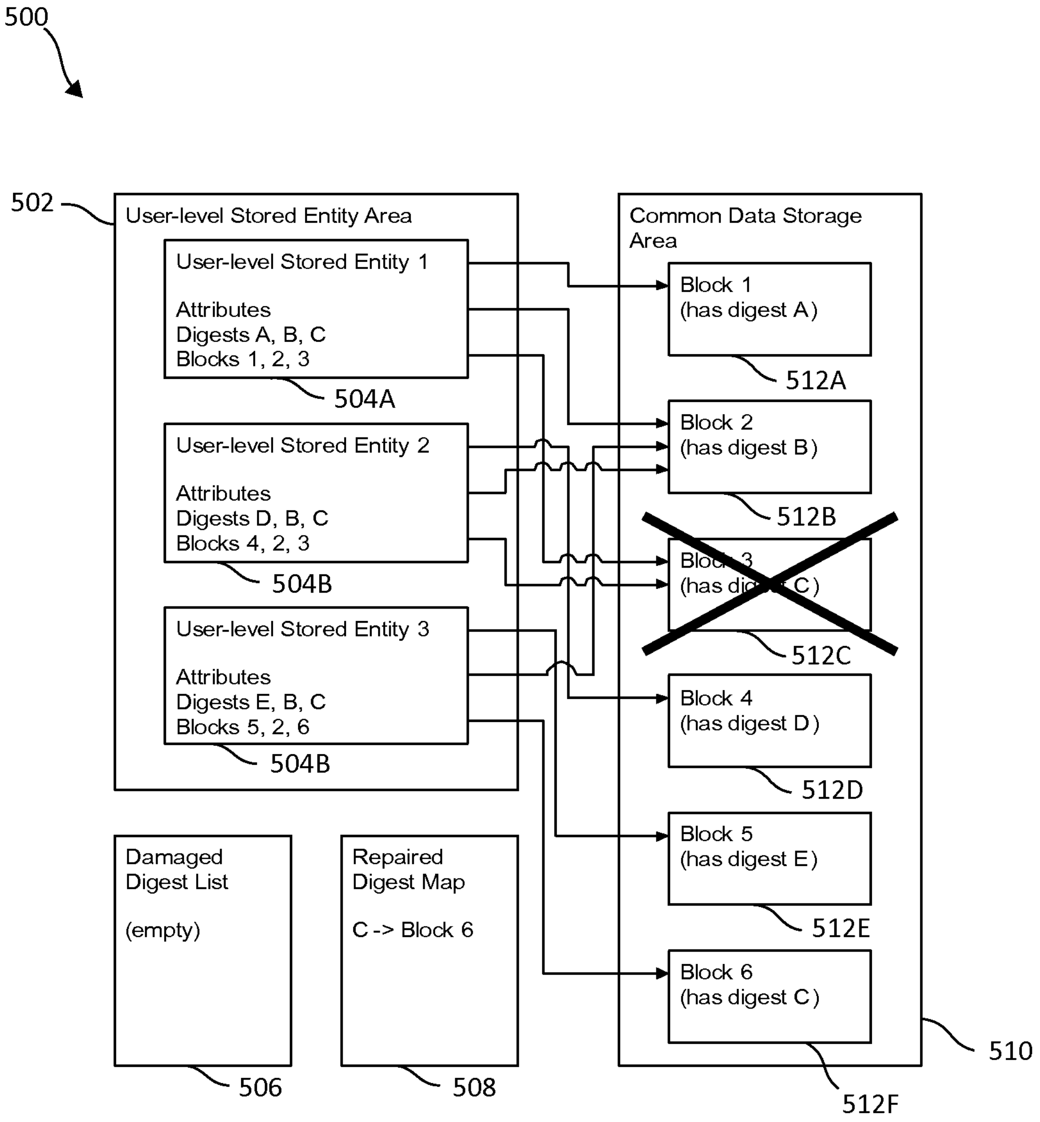
FIG. 5 is a block diagram illustrating a hardware structure using a damaged digest list with a new instance of a block with a digest restoring readability in which aspects of the present invention may be realized.

FIG. 5 is a block diagram illustrating a hardware structure 500 using a damaged digest list with a new instance of a block with a digest restoring readability in which aspects of the present invention may be realized. As illustrated in FIG. 5, the present invention implements self-healing of a lost deduplicated data via implementation using the damaged digest list 506 and/or the repaired digest map 508. In one embodiment, every user-level stored entity 504 (illustrated in FIG. 5 504A-B) stores its list of digests and a table of contents (TOC). The TOC, as shown within the user-level stored entities 504 showing the attributes, digests, and blocks, is a list of references to storage blocks 512 (e.g., illustrated in FIG. 5 as 512A-F) in a common storage area 510 where each entry 504 lists a block 512 and/or range of blocks 512A-F and/or an offset and range within the block or list of blocks. Given an initial repository content with 2 User-level Stored Entities 504, a repository may have the structure indicated in FIG. 5. For example, the digests of the data of User-level Stored Entity 2 504B are D, B, and C and the TOC of this entity 504B contains pointers to blocks 4, 2, and 3. For example, as illustrated in FIG. 5, user-level stored entity 504A shows the digest A, B, and C referencing to storage block 1 512A, storage block 2 512 B, and storage block 3 512C. The user-level stored entity 504B shows the digest D, B, and C referencing to storage block 4 512D, storage block 2 512 B, and storage block 3 512C. The data in the user-level stored entity 504 is the concatenation of the data in the offset-ranges of the block 512 or list of blocks 512 that are listed in the list of block references.

Figure 7:
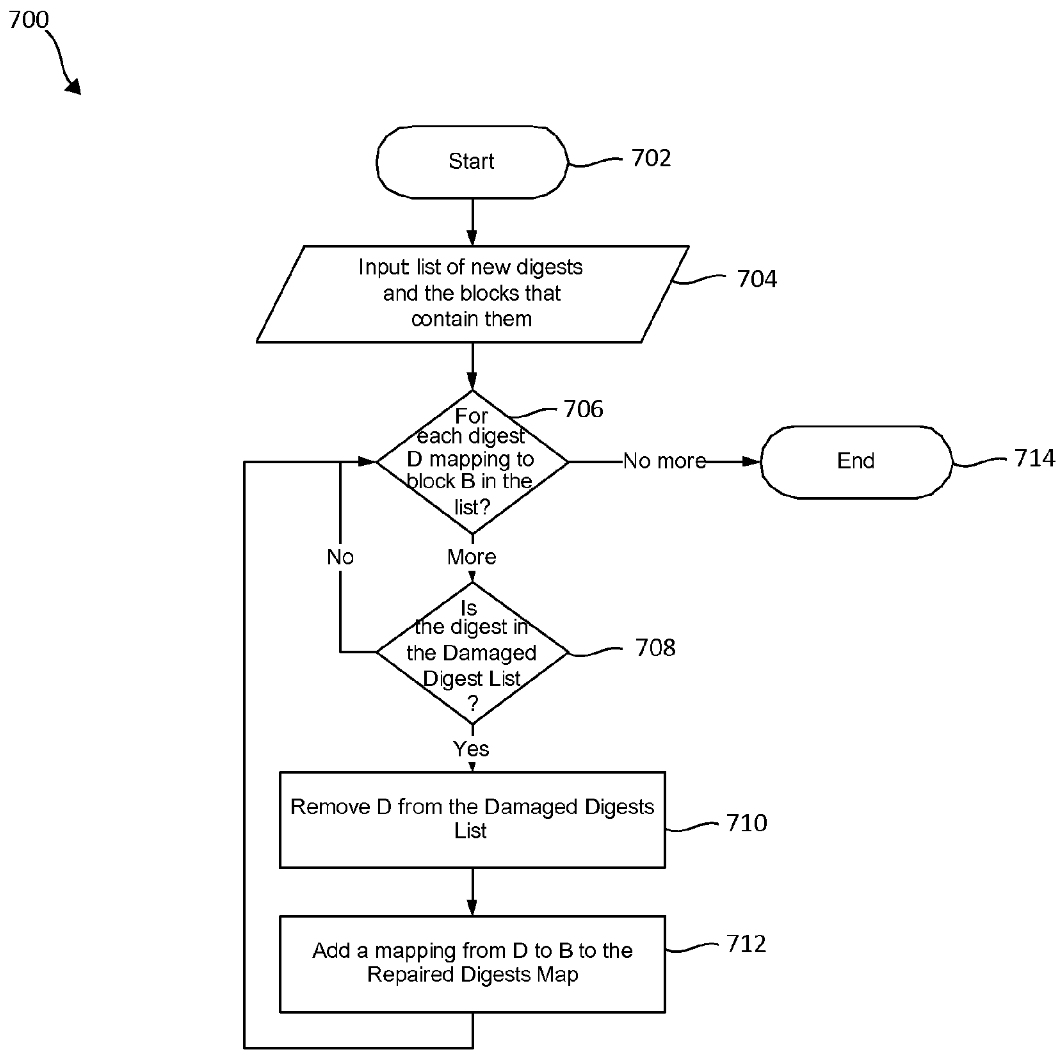
FIG. 7 is a flowchart illustrating an exemplary method for using a damaged digest list and updating data structures when processing new data in a hash-based deduplication system in which aspects of the present invention may be realized.

Moreover, FIG. 5 details a situation after a new and/or additional user-level stored entity 504C (User-level Stored Entity 3) has been processed by the system (according to the method described in FIG. 7). In one embodiment, by way of example only, the new entity 504C contains data that has the digest C. Since this digest was listed in the damaged digest list 506, it was known to have been unreadable. Processing digest C causes its removal from the damaged digest list 506, and causes an addition to be made to the repaired digest map 508 indicating to other user-level stored entities 504 (e.g., 504A and 504B) where the new data referred to by this digest can be found.

Figure 6:
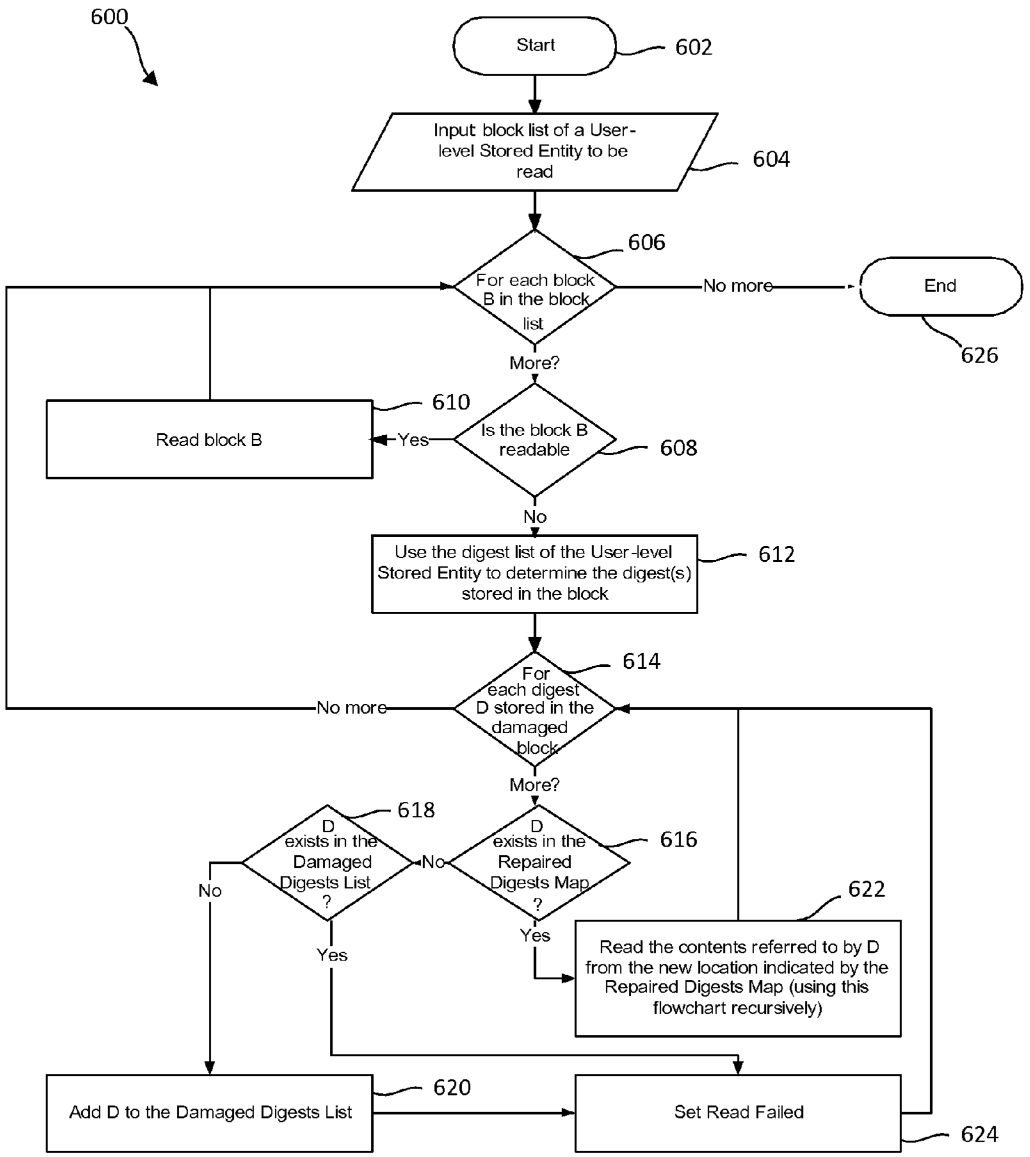
FIG. 6 is a flowchart illustrating an exemplary method for using a damaged digest list and reading with damaged blocks in a hash-based deduplication system in which aspects of the present invention may be realized.

FIG. 6 is a flowchart illustrating an exemplary method 600 for using a damaged digest list and reading with damaged blocks in a hash-based deduplication system in which aspects of the present invention may be realized. In one embodiment, FIG. 6 details the process of reading a user-level stored entity. The method 600 begins (step 602) with using a list of blocks needed to reconstruct a user-level stored entity and deals with list of blocks one at a time (step 604 and 606). A real system may process the blocks in parallel for efficiency reasons. If there are no additional blocks in the list of blocks to process the method 600 ends (step 626). If there are additional blocks in the list of blocks, the method 600 first makes an attempt to read the block (step 608). If this succeeds, then method 600 proceeds to the next block (step 610). If reading the block fails, then the hash deduplication system uses the list of digests that belong to the entity to ascertain which digest (step 612 and step 614). The method 600 searches for each of the digests stored in the damaged block that cannot be read in the repaired digests map (step 614). If there are no more digests in the damaged block, the method 600 returns to step 606. In one embodiment, for each digest, the method 600 starts a secondary loop that tries to recover the data whose hash is this digest. If there are more digests in the damaged blocks, and the method 600 determines if there are more digests existing in the repaired digests map (step 616), and the map indicates which alternate block must be read to find data that has the same hash value (probabilistically the same data) (step 622) (e.g., the method 600 reads the contents referred to by the digest from the new location indicated by the repaired digests map). If there are no more digests existing in the repaired digests map, the method 600 determines if the digests exist in the damaged digests list (step 618). If no, the digests is added to the damaged digests lists and then sets read as failed (step 624). If yes, the method 600, sets read as failed (step 624).

In one embodiment, if the digest was not found in the repaired digests map, then the entity as a whole cannot be read and the error must be reported to the user. However, in the meantime, the digest is added to the damaged digests list so that the system has a way of knowing that an entry in the repaired digests map is required if this digest is observed in a different User-level Stored Entity. However, in the meantime, the digest is added to the damaged digests lists so that the system has a way of knowing that an entry in the repaired digests map is required if this digest is observed in a different user-level stored entity.

Turning now to FIG. 7, is a flowchart illustrating an exemplary method 700 for using a damaged digest list and updating data structures when processing new data in a hash-based deduplication system in which aspects of the present invention may be realized is depicted. The method 700 begins (step 702) using a list of new digests and the blocks that contain the new digests (step 704). The method 700 determines if the digest was not found in the repaired digests map (step 706). In one embodiment, if the entity as a whole cannot be read and an error must be reported to the user (e.g., an operation to update the repaired list base on new data coming into the system as part of new backups). The method 700 ends if there are no more digests in the repaired digests map (e.g., the method 700 ends because there are no new digests that can potentially update the damaged list and repair blocks (step 714). If there are more digests in the repaired digests map, the method 700 determines if the digests in the damaged digests lists (step 708). If no, the method 700 returns to step 706. If yes, the method 700 removes the digests from the damaged digests list (step 710). The method 700 adds a mapping from the digest to an alternative digest repaired digests map (step 712). Thus, FIG. 7 details exemplary actions performed by a hash deduplication system when new data is ingested. In addition to the deduplicating actions, the system checks whether any of the digests are in damaged digests list, and if so, adds a mapping from the digest to where it will store the block containing the data whose digest this is.

Figure 8:
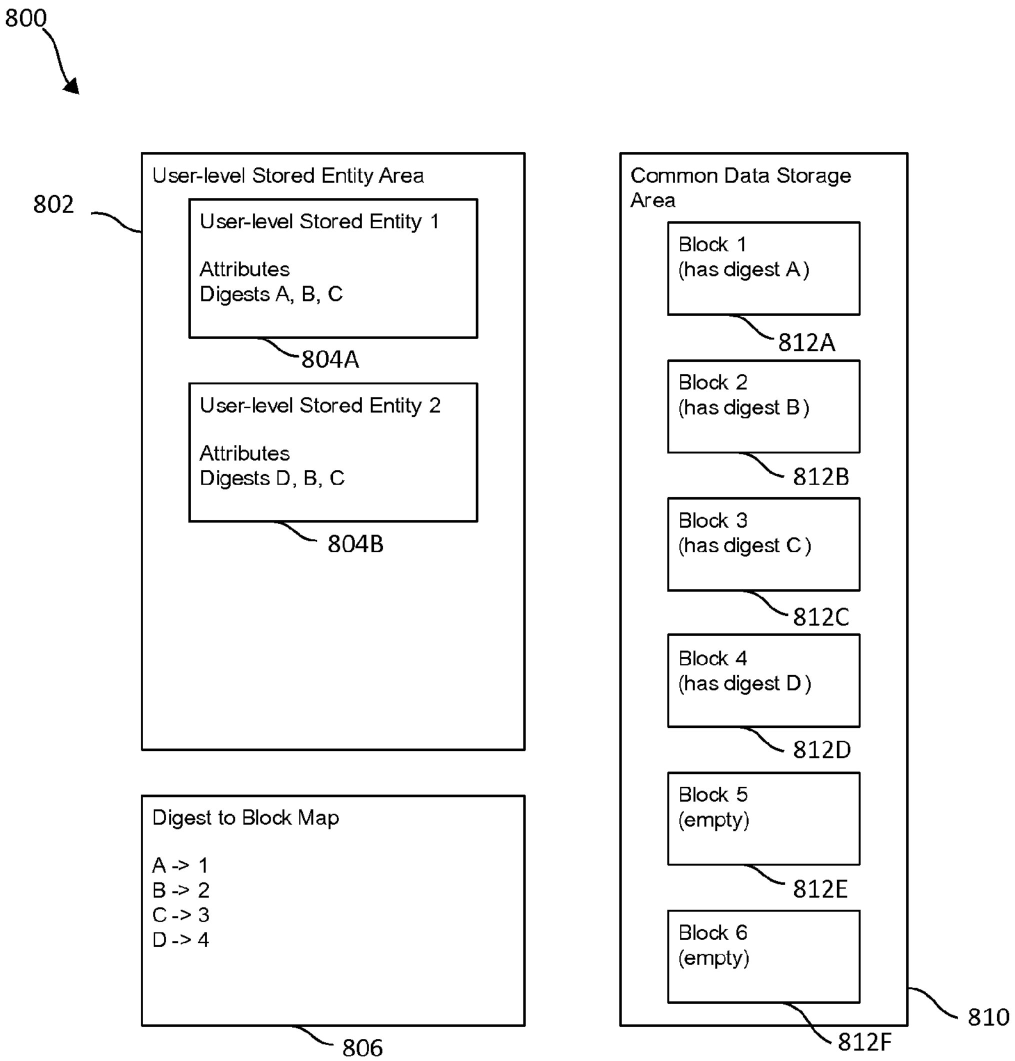
FIG. 8 is a block diagram illustrating a hardware structure using a digest-to-block map with 2 user-level stored entities sharing 2 of 3 blocks in which aspects of the present invention may be realized.

As described herein, the present invention provides solutions to implement self-healing of lost deduplicated data based on the type of deduplication system and in one embodiment, by way of example only, the present invention provides solutions to implement self-healing of lost deduplicated data via implementation using a digest-to-block map. In one embodiment, every user-level stored entity (part or whole of a virtual tape cartridge, part or whole of an OST image, part or whole of a file stored in a network-attached storage (NAS) device) stores only its list of digests. A digest-to-block map module is used to map the digests to the location used to store them. This digest-to-block map module may be implemented as some kind of global index or as a series of structures. The data in the user-level stored entity is the concatenation of the data in the blocks that are found using the digests as keys to search this map. FIG. 8 provides an example of this structure.

FIG. 8 is a block diagram illustrating a hardware structure 800 using a digest-to-block map with 2 user-level stored entities sharing 2 of 3 blocks in which aspects of the present invention may be realized. As illustrated in FIG. 8, the present invention implements self-healing of a lost deduplicated data via implementation using the digest to block map 806. In one embodiment, every user-level stored entity 804 (illustrated in FIG. 8 804A-B) stores its list of digests and a table of contents (TOC). The TOC, as shown within the user-level stored entities 804 showing the attributes, digests, and blocks, is a list of references to storage blocks 812 (e.g., illustrated in FIG. 8 as 812A-F) in a common storage area 810 where each entry 804 lists a block 812 and/or range of blocks 812A-F and/or an offset and range within the block or list of blocks. Given an initial repository content with 2 User-level Stored Entities 804, a repository may have the structure indicated in FIG. 8. For example, the digests of the data of User-level Stored Entity 2 804B are D, B, and C and the TOC of this entity 804B. For example, as illustrated in FIG. 8, user-level stored entity 804A shows the digest A, B, and C. The user-level stored entity 804B shows the digest D, B, and C. A digest-to-block map module 806 stores data that represents by the digest. The digests are values created based on mathematical manipulation done on a sequence of data inside the block. This digest-to-block map module 806 may be implemented as some kind of global index or as a series of structures. The data in the user-level stored entity is the concatenation of the data in the blocks that are found using the digests as keys to search the map (e.g., a digest to block map). For example, the digest-to-block map module 806 shows digest A is pointed to storage block 1 812A, digest B is pointed to storage block 2 812B, digest C is pointed to storage block 3 812C, and digest D is pointed to storage block 4 812D. Storage blocks 5 and 6 are shown as empty.

Figure 9:
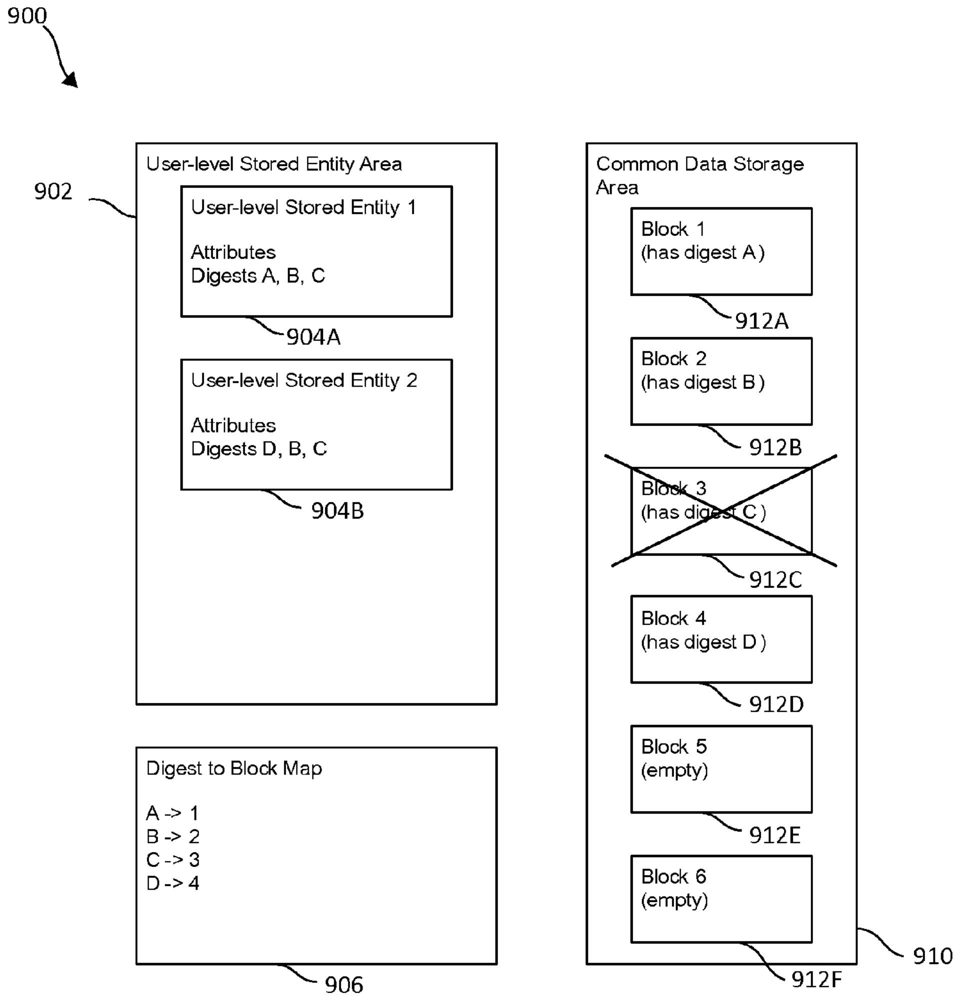
FIG. 9 is a block diagram illustrating a hardware structure using a digest-to-block map with loss of a block causing loss of readability of both user-level stored entities in which aspects of the present invention may be realized.

FIG. 9 is a block diagram illustrating a hardware structure 900 using a digest-to-block map with loss of a block causing loss of readability of both user-level stored entities in which aspects of the present invention may be realized. As illustrated in FIG. 9, the present invention implements self-healing of a lost deduplicated data via implementation using the digest to block map 906. In one embodiment, every user-level stored entity 904 (illustrated in FIG. 9 904A-B) stores its list of digests and a table of contents (TOC). The TOC, as shown within the user-level stored entities 904 showing the attributes, digests, and blocks, is a list of references to storage blocks 912 (e.g., illustrated in FIG. 9 as 912A-F) in a common storage area 910 where each entry 904 lists a block 912 and/or range of blocks 912A-F and/or an offset and range within the block or list of blocks. Given an initial repository content with 2 User-level Stored Entities 904, a repository may have the structure indicated in FIG. 9. For example, the digests of the data of User-level Stored Entity 2 904B are D, B, and C and the TOC of this entity 904B. For example, as illustrated in FIG. 9, user-level stored entity 904A shows the digest A, B, and C. The user-level stored entity 904B shows the digest D, B, and C. A digest-to-block map module 906 is used to map the digests to the location used to store them. This digest-to-block map module 906 may be implemented as some kind of global index or as a series of structures. The data in the user-level stored entity is the concatenation of the data in the blocks that are found using the digests as keys to search this map. For example, the digest-to-block map module 906 shows digest A is pointed to storage block 1 912A, digest B is pointed to storage block 2 912B, digest C is pointed to storage block 3 912C, and digest D is pointed to storage block 4 912D. However, FIG. 9 illustrates a situation after it has been discovered that block 3 912C can no longer be read. This is necessarily discovered when trying to retrieve the contents of the block 912C whose hash is C. The entry for C is removed from the digest to block map 906, and any attempt to retrieve an entity referencing C will fail, failing the read of whatever user-level stored entity 904 triggered the attempt to read the damaged block 912C.

Figure 10:
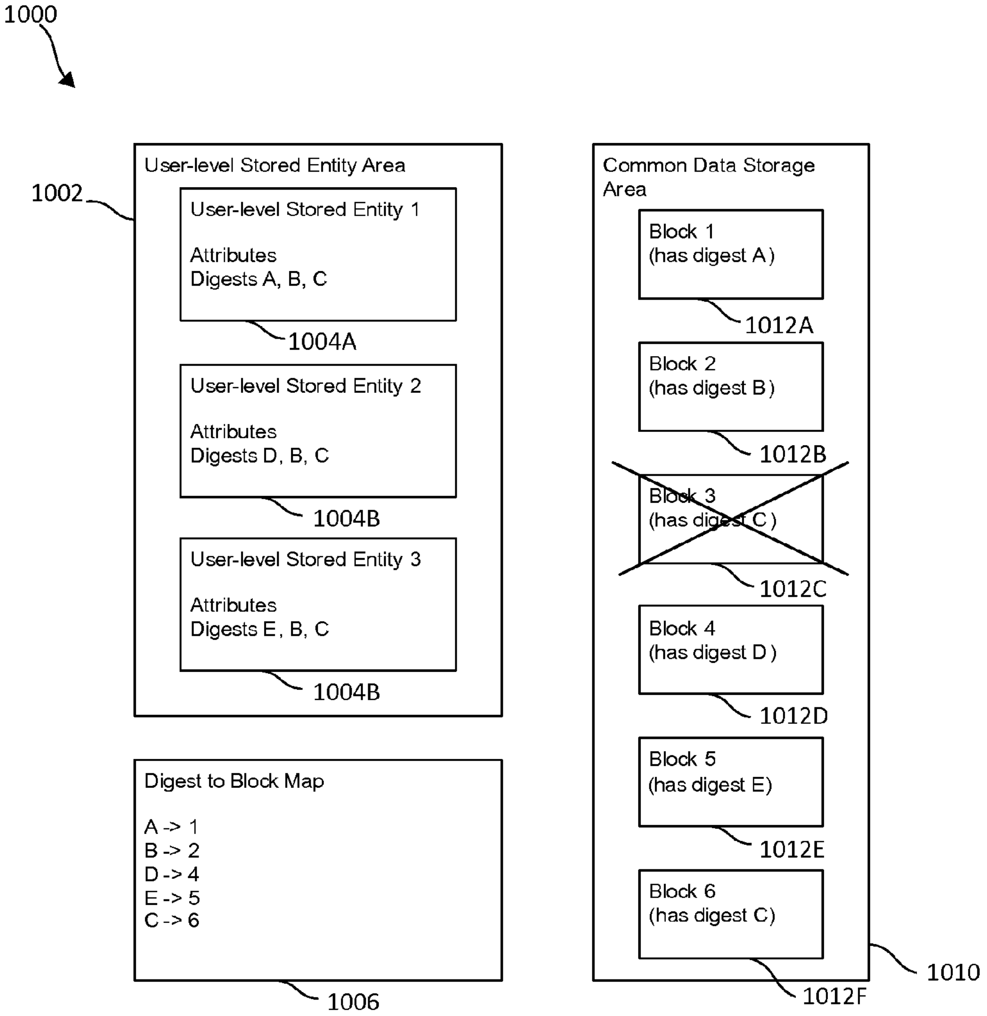
FIG. 10 is a block diagram illustrating a hardware structure using a digest-to-block map with a new instance of a block with a digest restoring readability in which aspects of the present invention may be realized.

FIG. 10 is a block diagram illustrating a hardware structure 1000 using a digest-to-block map with a new instance of a block with a digest restoring readability in which aspects of the present invention may be realized. As illustrated in FIG. 10, the present invention implements self-healing of a lost deduplicated data via implementation using the digest to block map 1006. In one embodiment, every user-level stored entity 1004 (illustrated in FIG. 10 1004A-B) stores its list of digests and a table of contents (TOC). The TOC, as shown within the user-level stored entities 1004 showing the attributes, digests, and blocks, is a list of references to storage blocks 1012 (e.g., illustrated in FIG. 10 as 1012A-F) in a common storage area 1010 where each entry 1004 lists a block 1012 and/or range of blocks 1012A-F and/or an offset and range within the block or list of blocks. Given an initial repository content with 2 User-level Stored Entities 1004, a repository may have the structure indicated in FIG. 10. For example, the digests of the data of User-level Stored Entity 2 1004B are D, B, and C and the TOC of this entity 1004B. For example, as illustrated in FIG. 10, user-level stored entity 1004A shows the digest A, B, and C. The user-level stored entity 1004B shows the digest D, B, and C. A digest-to-block map module 1006 is used to map the digests to the location used to store them. This digest-to-block map module 1006 may be implemented as some kind of global index or as a series of structures. The data in the user-level stored entity is the concatenation of the data in the blocks that are found using the digests as keys to search this map. For example, the digest-to-block map module 1006 shows digest A is pointed to storage block 1 1012A, digest B is pointed to storage block 2 1012B, digest C is pointed to storage block 3 1012C, and digest D is pointed to storage block 4 1012D. However, FIG. 10 illustrates a new user-level stored entity 1004C (number 3) has been added to the storage managed by the hash deduplication system. Since this entity 1004C also contains data that produces C when hashed, and since C was not in the digest-to-block map 1006 prior to the insertion of entity 3 1004C, the addition of entity 3 1004C causes a new entry to be added to the digest-to-block map 1006 showing digest C pointing to storage block 6 1012D, and digest E is pointing to storage block 5 1012E. The critical step shown in FIG. 10, is when it was discovered that it was not possible to read the block 1012C containing the data whose hash is C. This triggered removing C from the digest-to-block map 1006. If this step had not happened, then the act of storing entity 3 1004C would have found entry C in the digest-to-block map 1006 and new data for C would not have been stored in a new data block. This would have compounded the problem that entities 1 and 2 1004A and 1004B could not be read and entity 3 1004C would not be readable either.

Figure 11:
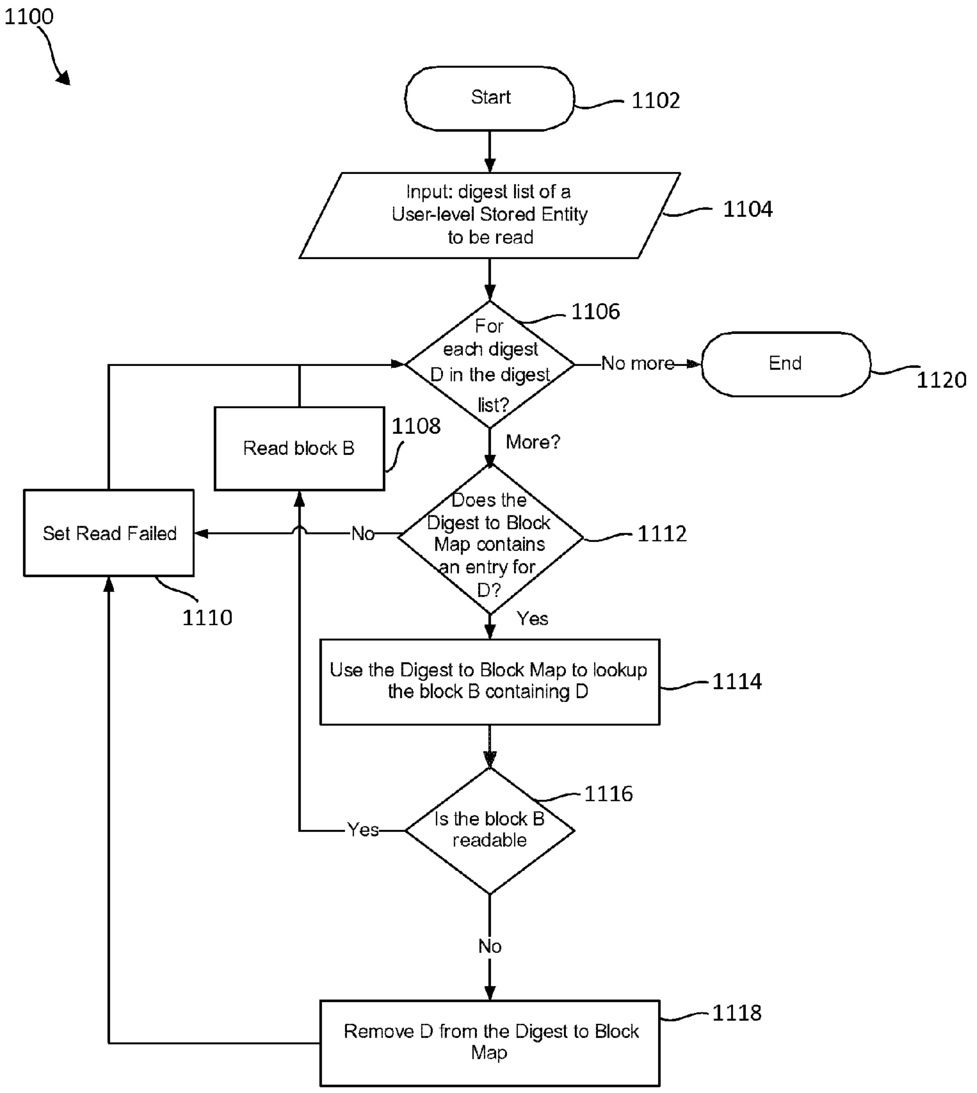
FIG. 11 is a flowchart illustrating an exemplary method for using a digest-to-block map and reading with damaged blocks in a hash-based deduplication system in which aspects of the present invention may be realized.

FIG. 11 is a flowchart illustrating an exemplary method 1100 for using a digest-to-block map and reading with damaged blocks in a hash-based deduplication system in which aspects of the present invention may be realized. In one embodiment, FIG. 11 provides a exemplary process for how a hash deduplication system, according to the present invention, may detect that a digest refers to data that is not readable and the action that it could take under these circumstances by using a digest-to-block map and reading data with damaged blocks. In one embodiment, FIG. 11 details the process of reading a user-level stored entity. The method 1100 begins (step 1102) with inputting of a digest list of a user-level stored entity to be read (step 1104) and does so for each digest (e.g., an identified digest such as "digest D") and determines if there are no additional blocks in the list of blocks to process (step 1106). If no, the method ends (step 1120). If there are additional blocks in the list of blocks, the method 600 determines if the digest-to-block map contains an entry for the digest (step 1112). If no, the method 1100 sets the read of the digest as a fail (step 1110) and then returns to step 1106. If yes, the method 1100 uses the digest-to-map to lookup a storage block containing the digest (step 1114). The method 1100 determines if the storage block containing the digest is readable (step 1116). If yes, the method 1100 reads the storage block (step 1108) and then returns to step 1106. If no, the method 1100 removes the digest from the digest-to-block map (step 1118) and returns to step 1110 and sets the read as failed.

In one embodiment, if the digest was not found in the repaired digests map, then the entity as a whole cannot be read and the error must be reported to the user. However, in the meantime, the digest is added to the damaged digests list so that the system has a way of knowing that an entry in the repaired digests map is required if this digest is observed in a different User-level Stored Entity. However, in the meantime, the digest is added to the damaged digests lists so that the system has a way of knowing that an entry in the repaired digests map is required if this digest is observed in a different user-level stored entity.

Figure 12:
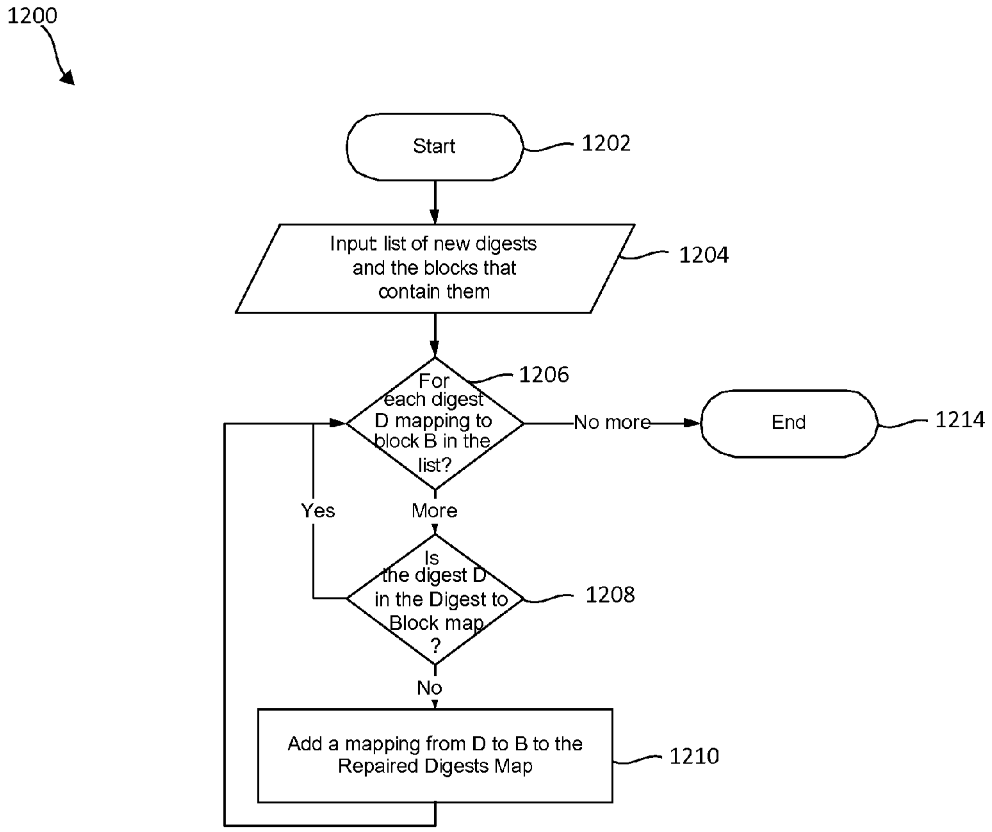
FIG. 12 is a flowchart illustrating an exemplary method for using a digest-to-block map and updating data structures when processing new data in a hash-based deduplication system in which aspects of the present invention may be realized.

FIG. 12, below, contains a flowchart showing how a hash deduplication system according to this embodiment could take actions if it finds that a digest key is missing from the digest to block map when entering a new entity into its common data storage area. This action implicitly renders unreadable data with the same digest readable as a side effect of previously removing the entry for the digest from the map, and now storing a new relevant entry.

FIG. 12 is a flowchart illustrating an exemplary method 1200 for using a digest-to-block map and updating data structures when processing new data in a hash-based deduplication system in which aspects of the present invention may be realized. The method 1200 begins (step 1202) inputs a list of new digests and the blocks that contain data that produce new digests when a hash function is used (e.g., input list of new digests and the blocks that contain them) (step 1204). The method 1200 determines if the digest is mapping to a storage block in the list of blocks (step 1206), then the entity as a whole cannot be read and the error must be reported to the user. The method 1200 ends if there are no more digests mapping to a storage block in the list of blocks (step 1214). If there are more digests mapping to a storage block in the list of blocks, the method 1200 determines if the digests in the digest-to-map lists (step 1208). If yes, the method 1200 returns to step 1206. If no, the method 1200 adds a mapping from the digest to an alternative digest to a repaired digests map (step 1210). Thus, FIG. 12 details example actions performed by a hash deduplication system when new data is ingested. In addition to the deduplicating actions, the system checks whether any of the digests are in digest-to-block map and if so adds a mapping from the digest to where it will store the block containing the data whose digest this is.

Thus, as described herein, the present invention provides a solution for self-healing in a hash-based deduplication system using a processor device in a computing environment. In one embodiment, by way of example only, deduplication digests of data and a corresponding list of the deduplication digests in a table of contents (TOC) are maintained for the self-healing of data that is lost or unreadable. The input data digests are compared to the TOC if directed to data that is lost or unreadable, and the input data digests are used to repair the one of lost and unreadable data.

In one embodiment, the present invention stores by each user-level stored entities a deduplication digest of data belonging to each one of the user-level stored entities with the corresponding list of the deduplication digest in the TOC. The TOC is a list of references to storage blocks in a common storage area where each entry lists one of a block and range of the storage blocks and an offset and range within one of the block and list of blocks, and the data in the user-level stored entities is a concatenation of the data in the offset and range within one of the block and list of blocks that are listed in the list of references to storage blocks.

In one embodiment, the present invention determines if the data is lost and/or unreadable data, adds the deduplication digests of the data determined to be lost and/or unreadable data to a damaged digest list, and/or repairs a damaged deduplication digest (e.g., a data sequence represented by a digest) in the damaged digests list. A repaired deduplication digest is removed from the damaged digests list. The repaired deduplication digest is mapped to a repaired digests map for indicating to other user-level stored entities, having the data referred to by the repaired deduplication digest, a storage location of the data of the repaired deduplication digest.

In one embodiment, the present invention reads one of the storage blocks, determines if one of the storage blocks is damaged if unable to be read, uses the list of the deduplication digests that belong to one of the user-level stored entities to ascertain which of the deduplication digests are stored in the damaged one of the storage blocks if the one of the storage blocks in unable to be read, identifies and recovers the data having a hash value in each of the deduplication digests stored in the damaged one of the storage blocks, searches in the repaired digests map for each one of the deduplication digests stored in the damaged one of the storage blocks that are not able to be read, indicates which of an alternative storage block must be read to locate the data that has a similar hash value if the one of the deduplication digests is located in the repaired digests map, and/or reports an error if one of deduplication digests stored in the damaged one of the storage blocks that are not able to be read is not located in the repaired digests map.

In one embodiment, the present invention uses a digest-to-block mapping module to map the deduplication digest to a storage location used to store the deduplication digest. The digest-to-block mapping module may be a global index module and/or a series of structures, and the data in the user-level stored entities is a concatenation of the data in storage blocks that are found using the deduplication digests as keys to search the digest-to-block mapping module.

In one embodiment, the present invention determines if the digest-to-block mapping module contains an entry for a deduplication digest, uses the digest-to-block mapping module to look up a storage block containing the deduplication digest in the digest-to-block mapping module, and/or removes the deduplication digest from the digest-to-block mapping module. In one embodiment, the present invention inputs into the list of the deduplication digests a new deduplication digest.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A method for self-healing in a hash-based deduplication system using a processor device in a computing environment, the method comprising:

maintaining deduplication digests of data with a corresponding list of the deduplication digests in a table of contents (TOC) for the self-healing of data that is one of lost and unreadable within each one of a plurality of user-level stored entities, the user-level stored entities each comprising a file portion of a virtual tape cartridge, such that only the deduplication digests corresponding to the data stored on a given virtual tape cartridge are listed in the TOC of the given virtual tape cartridge;

comparing input data digests to the TOC if directed to data that is one of lost and unreadable and using the input data digests to repair the one of lost and unreadable data;

storing by each one of the plurality of user-level stored entities a deduplication digest of data belonging to each one of the plurality of user-level stored entities and the corresponding list of the deduplication digest in the TOC, wherein the TOC is a list of references to storage blocks in a common storage area where each entry lists one of a block and range of the storage blocks and an offset and range within one of the block and list of blocks, and wherein the data in the one of the plurality of user-level stored entities is a concatenation of the data in the offset and range within one of the block and list of blocks that are listed in the list of references to storage blocks; determining if a digest-to-block mapping module contains an entry for a deduplication digest, the digest-to-block mapping module searching only for the deduplication digest within the given virtual tape cartridge of which the data for the entry resides;

using the digest-to-block mapping module to look up a storage block containing the deduplication digest in the digest-to-block mapping module; and removing the deduplication digest from the digest-to-block mapping module when the storage block is found to be unreadable.

2. The method of claim 1, further including performing one of: determining the data is one of lost and unreadable data, adding the deduplication digests of the data determined to be the one of lost and unreadable data to a damaged digest list, repairing a data sequence represented by a digest in the damaged digests list, wherein a repaired deduplication digest is removed from the damaged digests list, and mapping the repaired deduplication digest to a repaired digests map for indicating to those of the plurality of user-level stored entities, having the data referred to by the repaired deduplication digest, a storage location of the data of the repaired deduplication digest.

3. The method of claim 2, further including performing one of:

reading one of the storage blocks, determining the one of the storage blocks is damaged if unable to be read, using the list of the deduplication digests that belong to one of the plurality of user-level stored entities to ascertain which of the deduplication digests are stored in the damaged one of the storage blocks if the one of the storage blocks in unable to be read, identifying and recovering the data having a hash value in each of the deduplication digests stored in the damaged one of the storage blocks, searching in the repaired digests map for each one of the deduplication digests stored in the damaged one of the storage blocks that are not able to be read, indicating which of an alternative storage block must be read to locate the data that has a similar hash value if the one of the deduplication digests is located in the repaired digests map, and reporting an error if the one of the deduplication digests stored in the damaged one of the storage blocks that are not able to be read is not located in the repaired digests map.

4. The method of claim 1, further including using the digest-to-block mapping module to map the deduplication digest to a storage location used to store the deduplication digest, wherein the digest-to-block mapping module is one of a global index module and a series of structures, wherein the data in one of a plurality of user-level stored entities is a concatenation of the data in storage blocks that are found using the deduplication digests as keys to search the digest-to-block mapping module.

5. The method of claim 1, further including inputting into the list of the deduplication digests a new deduplication digest.

6. A system for self-healing in a hash-based deduplication system in a computing environment, the system comprising:

the hash-based deduplication system; a plurality of user-level stored entities in the hash-based deduplication system;

storage blocks in the hash-based deduplication system;

a digest-to-block mapping module in the hash-based deduplication system;

a repaired digest map in the hash-based deduplication system;

a plurality of lists in the hash-based deduplication system, wherein the plurality of lists includes at least a corresponding list of the deduplication digests in a table of contents (TOC) and a damaged deduplication digests list; and at least one processor device operable in the hash-based deduplication system, wherein the at least one processor device:

maintains deduplication digests of data with the corresponding list of the deduplication digests in the TOC for the self-healing of data that is one of lost and unreadable within each one of a plurality of user-level stored entities, the user-level stored entities each comprising a file portion of a virtual tape cartridge, such that only the deduplication digests corresponding to the data stored on a given virtual tape cartridge are listed in the TOC of the given virtual tape cartridge, compares input data digests to the TOC if directed to data that is one of lost and unreadable and using the input data digests to repair the one of lost and unreadable data, stores by each one of the plurality of user-level stored entities a deduplication digest of data belonging to each one of the plurality of user-level stored entities and the corresponding list of the deduplication digest in the TOC, wherein the TOC is a list of references to storage blocks in a common storage area where each entry lists one of a block and range of the storage determines if a digest-to-block mapping module contains an entry for a deduplication digest, the digest-to-block mapping module searching only for the deduplication digest within the given virtual tape cartridge of which the data for the entry resides, uses the digest-to-block mapping module to look up a storage block containing the deduplication digest in the digest-to-block mapping module, and removes the deduplication digest from the digest-to-block mapping module when the storage block is found to be unreadable.

7. The system of claim 6, wherein the at least one processor device performs one of:

determining the data is the one of lost and unreadable data, adding the deduplication digests of the data determined to be the one of lost and unreadable data to the damaged digest list, repairing a data sequence represented by a digest in the damaged digests list, wherein a repaired deduplication digest is removed from the damaged digests list, and mapping the repaired deduplication digest to the repaired digests map for indicating to those of the plurality of user-level stored entities, having the data referred to by the repaired deduplication digest, a storage location of the data of the repaired deduplication digest.

8. The system of claim 7, wherein the at least one processor device performs one of:

reading one of the storage blocks, determining the one of the storage blocks is damaged if unable to be read, using the list of the deduplication digests that belong to one of the plurality of user-level stored entities to ascertain which of the deduplication digests are stored in the damaged one of the storage blocks if the one of the storage blocks in unable to be read, and identifying and recovering the data having a hash value in each of the deduplication digests stored in the damaged one of the storage blocks, searching in the repaired digests map for each one of the deduplication digests stored in the damaged one of the storage blocks that are not able to be read, indicating which of an alternative storage block must be read to locate the data that has a similar hash value if the one of the deduplication digests is located in the repaired digests map, and reporting an error if the one of the deduplication digests stored in the damaged one of the storage blocks that are not able to be read is not located in the repaired digests map.

9. The system of claim 6, wherein the at least one processor device uses the digest-to-block mapping module to map the deduplication digest to a storage location used to store the deduplication digest, wherein the digest-to-block mapping module is one of a global index module and a series of structures, wherein the data in one of a plurality of user-level stored entities is a concatenation of the data in storage blocks that are found using the deduplication digests as keys to search the digest-to-block mapping module.

10. The system of claim 6, wherein the at least one processor device inputs into the list of the deduplication digests a new deduplication digest.

11. A computer program product for self-healing in a hash-based deduplication system by a processor device, the computer program product comprising a non-transitory computer-readable storage medium having computer-readable program code portions stored therein, the computer-readable program code portions comprising:

a first executable portion that maintains deduplication digests of data with a corresponding list of the deduplication digests in a table of contents (TOC) for the self-healing of data that is one of lost and unreadable within each one of a plurality of user-level stored entities, the user-level stored entities each comprising a file portion of a virtual tape cartridge, such that only the deduplication digests corresponding to the data stored on a given virtual tape cartridge are listed in the TOC of the given virtual tape cartridge;

a second executable portion that comparing input data digests to the TOC if directed to data that is one of lost and unreadable and using the input data digests to repair the one of lost and unreadable data;

a third executable portion that stores by each one of the plurality of user-level stored entities a deduplication digest of data belonging to each one of the plurality of user-level stored entities and the corresponding list of the deduplication digest in the TOC, wherein the TOC is a list of references to storage blocks in a common storage area where each entry lists one of a block and range of the storage blocks and an offset and range within one of the block and list of blocks, and wherein the data in the one of the plurality of user-level stored entities is a a fourth executable portion that determines if a digest-to-block mapping module contains an entry for a deduplication digest, the digest-to-block mapping module searching only for the deduplication digest within the given virtual tape cartridge of which the data for the entry resides;

a fifth executable portion that uses the digest-to-block mapping module to look up a storage block containing the deduplication digest in the digest-to-block mapping module; and a sixth executable portion that removes the deduplication digest from the digest-to-block mapping module when the storage block is found to be unreadable.

12. The computer program product of claim 11, further includes a sixth executable portion that performs one of:

determining the data is the one of lost and unreadable data, adding the deduplication digests of the data determined to be the one of lost and unreadable data to a damaged digest list, repairing a data sequence represented by a digest in the damaged digests list, wherein a repaired deduplication digest is removed from the damaged digests list, and mapping the repaired deduplication digest to a repaired digests map for indicating to those of the plurality of user-level stored entities, having the data referred to by the repaired deduplication digest, a storage location of the data of the repaired deduplication digest.

13. The computer program product of claim 12, further includes a seventh executable portion that performs one of:

reading one of the storage blocks, determining the one of the storage blocks is damaged if unable to be read, using the list of the deduplication digests that belong to one of the plurality of user-level stored entities to ascertain which of the deduplication digests are stored in the damaged one of the storage blocks if the one of the storage blocks in unable to be read, identifying and recovering the data having a hash value in each of the deduplication digests stored in the damaged one of the storage blocks, searching in the repaired digests map for each one of the deduplication digests stored in the damaged one of the storage blocks that are not able to be read, indicating which of an alternative storage block must be read to locate the data that has a similar hash value if the one of the deduplication digests is located in the repaired digests map, and reporting an error if the one of the deduplication digests stored in the damaged one of the storage blocks that are not able to be read is not located in the repaired digests map.

14. The computer program product of claim 12, further includes a seventh executable portion that uses a digest-to-block mapping module to map the deduplication digest to a storage location used to store the deduplication digest, wherein the digest-to-block mapping module is one of a global index module and a series of structures, wherein the data in one of a plurality of user-level stored entities is a concatenation of the data in storage blocks that are found using the deduplication digests as keys to search the digest-to-block mapping module.

15. The computer program product of claim 12, further includes a seventh executable portion that inputs into the list of the deduplication digests a new deduplication digest.

* * * * *